United States Patent [19]

Boncoeur et al.

[11] Patent Number: 4,983,339
[45] Date of Patent: Jan. 8, 1991

[54] PROCESS FOR SHAPING A MATERIAL BY HOT ISOSTATIC PRESSING AND TITANIUM SHEATH USABLE IN THIS PROCESS

[75] Inventors: Marcel Boncoeur, Paris; Thierry Lieven, Montrouge; Marc Palacio, Arcueil, all of France

[73] Assignee: Commissariat A L'Energie Atomique, Paris, France

[21] Appl. No.: 229,226

[22] Filed: Aug. 5, 1988

[30] Foreign Application Priority Data

Aug. 5, 1987 [FR] France ................................ 87 11122

[51] Int. Cl.$^5$ ............................................. C04B 35/64
[52] U.S. Cl. ...................................... 264/56; 264/317; 264/332; 419/10; 419/49; 419/68
[58] Field of Search ................. 264/56, 317, 570, 332; 419/10, 68, 49

[56] References Cited

U.S. PATENT DOCUMENTS

| | | | |
|---|---|---|---|
| 3,340,053 | 9/1967 | Hodge et al. | 75/208 |
| 3,466,734 | 9/1969 | Vordahl | 29/470.9 |
| 3,627,521 | 12/1971 | Vordahl | 75/226 |
| 4,007,251 | 2/1977 | Isaksson et al. | 264/332 |
| 4,560,668 | 12/1985 | Harold et al. | 501/97 |

FOREIGN PATENT DOCUMENTS 3422174 12/1985 Fed. Rep. of Germany .
1415482 11/1975 United Kingdom .

*Primary Examiner*—James Derrington
*Attorney, Agent, or Firm*—Pearne, Gordon, McCoy & Granger

[57] ABSTRACT

The invention relates to a process for shaping a material by isostatic compression at a temperature of at least 1300° C. of a powder of said material in a tight sheath.

The sheath is made from titanium or a titanium alloy and is internally coated with tantalum in such a way that the sheath can be embrittled during hot isostatic compression, by the diffusion of tantalum into the titanium or titanium alloy, in the presence of oxygen. In general, the titanium sheath is coated with tantalum by spraying in the presence of oxygen.

The use of such a sheath makes it possible to avoid the operation of eliminating the sheath chemically or mechanically conventionally necessary in such processes.

9 Claims, No Drawings

PROCESS FOR SHAPING A MATERIAL BY HOT ISOSTATIC PRESSING AND TITANIUM SHEATH USABLE IN THIS PROCESS

DESCRIPTION

The present invention relates to a process for shaping a material by hot isostatic pressing. More specifically, it relates to processes for shaping materials, in which a powder of the material, optionally in the form of a preform, is introduced into a ductile sheath or envelope, the latter is sealed and the sealed sheath undergoes hot isostatic pressing.

Processes of this type are described, for example, in French Patent No. FR-A-2 353 355, European Patent No. EP-A-0 036 202 and U.S. Pat. No. 4,007,251. Generally the sheaths are made from stainless steel, mild steel, titanium, zirconium or an alloy of titanium or zirconium. At the end of the operation theY have to be eliminated either mechanically, e.g. by cutting, or chemically, e.g. by dissolving in an appropriate solvent.

Thus, the use of such sheaths involves the supplementary operations of desheathing and machining the parts obtained. Moreover, during the cooling of the part shaped by hot isostatic pressing, certain thermomechanical stresses can be produced by the sheath in the shaped material and consequently can lead to breaks and/or cracks.

The present invention relates to a process for shaping a ceramic material by hot isostatic pressing, in which use is made of a particular sheath making it possible to obviate the aforementioned disadvantages.

The inventive process for shaping a material by isostatic pressing or compression at a temperature of at least 1300° C. of a powder of said material located in a tight sheath is characterized in that the sheath is made from titanium or a titanium alloy and that it is internally coated with tantalum, in such a way that the sheath can be embrittled during the hot isostatic pressing, by the diffusion of tantalum into the titanium or titanium alloy, in the presence of oxygen.

Thus, the choice of such a sheath makes it possible to obviate the desheathing operations necessary in the prior art because, following cooling to ambient temperature, the sheath is damaged and can easilY be separated from the shaped part. Moreover, the fact that the sheath is embrittled makes it possible to avoid during cooling the formation of thermomechanical stresses by the sheath in the shaped part, which lead to cracks and breakages in the shaped material. Moreover, through the use of such a sheath, it is no longer necessary to provide internal coatings to facilitate the elimination of the sheath at the end of the operation and the machining of the part to the final dimensions is greatly simplified. A single grinding operation is sufficient, which is very advantageous in the case of very hard material parts.

In the invention, the deterioration of the sheath is due to the diffusion of the tantalum into the titanium sheath with the simultaneous embrittlement by oxygen. In such a process, the oxygen can be supplied into the sheath either prior to the isostatic pressing, e.g. during the deposition of the tantalum in the titanium sheath, or by a subsequent treatment of the tantalum-coated titanium sheath in a neutral atmosphere, or during the isostatic pressing by the material to be shaped.

In general, on using the process according to the invention with materials not having oxygen, the oxygen is supplied to the tantalum-coated titanium sheath by forming the tantalum coating by spraying in the presence of oxygen. This can in particular be brought about by spraying using a plasma torch in the presence of air. It is also possible to supply the oxygen to a tantalum-coated sheath in a neutral atmosphere by subsequently performing an oxidation treatment of the coated sheath, e.g. by heating in an oxidizing atmosphere.

However, when the ceramic material to be shaped is an oxygen-containing material, e.g. an oxide such as alumina, there is no need to supply oxygen to the titanium sheath and in this case the sheath can be coated by spraying in a neutral atmosphere.

In the process of the invention, the temperature used during isostatic compression also plays a very important part in ensuring an adequate diffusion of the tantalum into the titanium. Thus, at temperatures below 1300° C., it is difficult to bring about the embrittlement of the sheath. It is also necessary to operate at temperatures above 1300° C. and better still at temperatures above 1350° C.

Under the conditions given hereinbefore, the tantalum reacts with the titanium at the temperature of the hot isostatic pressing in order to embrittle the sheath without leading to any deterioration of the shaped material. The tantalum only reacts very slowly and in a very superficial manner, because it is necessary for the sheath to remain intact up to the end of the densification of the material, so that it can still fulfill its protective function. Moreover, the compound formed by the reaction of the tantalum with the titanium in the presence of oxygen does not contaminate the material and does not stick to it. Moreover, the compound formed is neither harmful, nor toxic. It only embrittles the sheath at the end of the isostatic compression, so that it breaks during the cooling of the part to ambient temperature.

Generally, the titanium or titanium alloy sheath has a thickness of 0.8 to 3 mm and the internal tantalum layer has a thickness of 0.08 to 0.150 mm. Such thicknesses make it possible to transmit the isostatic pressure, whilst retaining an adequate resistance during compression and they are not sufficiently great as to prevent an adequate deterioration of the sheath to ensure that it breaks during cooling.

The inventive process can be used for shaping different materials, particularly those based on boron, carbon, carbides, e.g. silicon carbide, borides, e.g. titanium, zirconium and rare earth borides, oxides such as alumina, silicides and ceramic materials or difficultly producible composites, such as ceramic-metal composites and ceramic-ceramic composites.

However, it is necessary that the materials used in the inventive process can be shaped at temperatures below the melting point of titanium (1650° C.) or the titanium alloy constituting the sheath. However, with materials requiring higher temperatures, it is possible to use the inventive process for carrying out a first shaping cycle at temperatures below the melting point of the sheath and then continue the fritting of the material, in the absence of the sheath, at higher temperatures if the product obtained during the first treatment cycle has adequate characteristics.

Other features and advantages of the invention can be gathered from studying the following illustrative and non-limitative examples.

EXAMPLE 1

The starting product is a boron powder with a grain size below 38 μm and it is introduced into a 0.8 mm thick titanium sheath and a straight cylinder is formed with a height of 50 mm and a diameter of 250 mm, which has been internally coated with a 0.1 mm thick tantalum layer by plasma torch projection in the presence of air.

The boron powder is compacted within the sheath until a density is obtained representing more than 50% of the theoretical density and then the sheath is placed under a preliminary vacuum and is welded. The sealed sheath is then introduced into a hot isostatic compression means, the pressure is raised to 230 MPa and the temperature to 1550° C. and said temperature and pressure are maintained for 30 minutes.

During this treatment, the titanium sheath is embrittled by the diffusion of tantalum into the titanium in the presence of oxygen, which has been adsorbed by the tantalum powder during the plasma torch projection. The sheath breaks on cooling to ambient temperature.

Thus, it is easy to remove the sheath, because it is merely necessary to remove deteriorated sheath fragments, which are disengaged from the part obtained. The latter has the theoretical density. It is free from cracking and there is no significant growth in the size of the grains. There are also no parasitic phases.

In addition, there has been no increase in the amount of impurities in the starting boron powder during the hot compression operation, as is indicated by the analysis results given in the following table.

TABLE

| ELEMENTS | STARTING POWDER | FINAL MATERIAL |
|---|---|---|
| C | 0.4 to 0.55% | 0.4 to 0.6% |
| O2 | 0.2 to 0.5% | 0.3 to 0.6% |
| Si | 900 to 1200 ppm | 1200 ppm |
| Mn | 580 to 660 ppm | 650 |
| Mg | 90 to 130 | 100 |
| Fe | 1000 to 1400 ppm | 1300 |
| Tl | 90 to 170 ppm | 110 |
| Al | 470 to 800 | 660 |
| Ca | 210 to 300 | 290 |
| Cu | 90 to 130 | 120 |
| Zr | 220 to 350 | 240 |

In this example, it is possible to start with a preform obtained by cold isostatic pressing of the boron powder, followed by the introduction of said preform into the tantalum-coated titanium sheath. Under these conditions results identical to those described hereinbefore are obtained.

EXAMPLE 2

The starting product is the same boron powder as in example 1 and it is introduced into a tantalum-coated titanium sheath as in example 1. The same procedure as in example 1 is adopted, but isostatic compression takes place at a temperature of 1390° C.

Under these conditions, the sheath is deteriorated and is destroyed during the cooling operation. The part obtained has a density corresponding to 95% of the theoretical density.

EXAMPLE 3

The procedure of examples 1 and 2 is repeated starting with the same boron powder, but hot isostatic compression takes place at a temperature of 1200° C. Under these conditions, the titanium sheath is slightly embrittled, but during cooling it is not destroyed and it is difficult to eliminate, as in the prior art. Thus, the temperature used for hot isostatic pressing is not adequate for embrittling the tantalum-coated titanium sheath.

EXAMPLE 4

This example makes use of the same boron powder as in example 1, but it is cold compressed by isostatic pressing to form a preform, which is covered with the aid of tantalum sheets prior to introducing it into a titanium sheath having the same thickness and the same dimensions as in example 1. Following the sealing of the sheath, hot isostatic compression takes place under the same conditions as in example 1.

At the end of the operation, the sheath is not destroyed. It has consequently not been embrittled as in example 1 and it is assumed that this is due to the fact that use is made of tantalum sheets. Thus, with solid tantalum, the adsorbed oxygen quantity is lower. Moreover, the diffusion of tantalum into the titanium is made more difficult than in example 1, where the tantalum is in powder form. However, a boron part is obtained having the theoretical density and identical crystallographic characteristics to those obtained in example 1.

We claim:

1. In a process for shaping a powder of a material enclosed within a sheath by isostatic pressing at a temperature of at least 1300° C. the improvement comprising the steps of providing said sheath of titanium or a titanium alloy, internally coating a tantalum layer on said sheath, and diffusing said tantalum into the titanium or titanium alloy in the presence of oxygen during isostatic compression to embrittle said sheath.

2. Process for shaping a material by isostatic pressing comprising the steps of enclosing a powder of said material in a tight sheath formed by providing an outer layer of titanium or a titanium alloy and coating an inner layer of tantalum on the inner surface of the sheath so that the powder is in contact with the tantalum layer, and isostatically pressing the sheath at a temperature of at least 1300° C. so that the sheath is embrittled during hot isostatic compression, through the diffusion of the tantalum into the titanium or titanium alloy, in the presence of oxygen.

3. Process according to claim 2 characterized in that the material is chosen from among boron, carbon, carbides and silicides.

4. Process according to claim 2, characterized in that the inner layer is prepared by coating the outer layer of titanium or titanium alloy with tantalum by hot spraying or projection in the presence of oxygen.

5. Process according to claim 4, characterized in that the material is chosen from among silicon carbide and borides of titanium, zirconium and rare earths.

6. Process according to claim 2, characterized in that the material is an oxide.

7. Process according to claim 4, characterized in that the material is chosen from among boron, carbon, carbides and silicides.

8. Process according to claim 2, characterized in that the material is alumina and that the inner layer is prepared by coating with tantalum the outer layer of titanium or titanium alloy by spraying in a neutral atmosphere.

9. Process according to claim 2, characterized in that the titanium outer layer has a thickness of 0.8 to 3 mm.

* * * * *